United States Patent
Serna García-Conde

(10) Patent No.: US 10,669,736 B2
(45) Date of Patent: Jun. 2, 2020

(54) GUIDING DEVICE FOR ASSEMBLING WIND TURBINE TOWERS

(71) Applicant: ESTEYCO S.A., Madrid (ES)

(72) Inventor: Jose Serna García-Conde, Madrid (ES)

(73) Assignee: Esteyco S.A., Madrid (ES)

(*) Notice: Subject to any disclaimer, the term of this patent is extended or adjusted under 35 U.S.C. 154(b) by 0 days.

(21) Appl. No.: 15/762,977

(22) PCT Filed: Sep. 20, 2016

(86) PCT No.: PCT/ES2016/070653
§ 371 (c)(1),
(2) Date: Mar. 23, 2018

(87) PCT Pub. No.: WO2017/051048
PCT Pub. Date: Mar. 30, 2017

(65) Prior Publication Data
US 2019/0085583 A1 Mar. 21, 2019

(30) Foreign Application Priority Data
Sep. 23, 2015 (ES) .................................. 201531355

(51) Int. Cl.
*E04H 12/34* (2006.01)
*E04H 5/02* (2006.01)
(Continued)

(52) U.S. Cl.
CPC .......... *E04H 12/34* (2013.01); *E02D 27/425* (2013.01); *E04H 5/02* (2013.01); *E04H 12/18* (2013.01);
(Continued)

(58) Field of Classification Search
CPC .......... E04H 12/34; E04H 5/02; E04H 12/18; F03D 13/25
See application file for complete search history.

(56) References Cited

U.S. PATENT DOCUMENTS 4,932,176 A * 6/1990 Roberts .................. E04H 12/182
  182/148
5,149,304 A * 9/1992 Purser ..................... E04B 1/346
  472/131
(Continued)

FOREIGN PATENT DOCUMENTS

EP 0201645 A2 11/1986
FR 2476727 A2 8/1981
(Continued)

OTHER PUBLICATIONS

International Search Report received in PCT Application No. PCT/ES2016/070653, dated Dec. 13, 2016.
(Continued)

*Primary Examiner* — Paola Agudelo
(74) *Attorney, Agent, or Firm* — Knobbe, Martens, Olson & Bear, LLP

(57) ABSTRACT

The invention relates to a guiding device for assembling towers and/or foundations for wind turbines, intended to enable and/or facilitate relative movement between a mobile element and a support element, at least one of said elements being a section and/or part of the shaft of a wind turbine tower or foundation. The guiding device comprises: sliding means that are in contact with the mobile element and allow the relative movement thereof with respect to the guiding device; securing means that connect the guiding device to the support element; and means for geometric adaptation disposed between the sliding means and the securing means, which allow load transmission between the sliding means (Continued)

and the securing means while at the same time also allowing relative movement between the two.

17 Claims, 15 Drawing Sheets

(51) Int. Cl.
  *F03D 1/00* (2006.01)
  *E04H 12/18* (2006.01)
  *F03D 13/25* (2016.01)
  *E02D 27/42* (2006.01)

(52) U.S. Cl.
  CPC .............. *E04H 12/182* (2013.01); *F03D 1/00* (2013.01); *F03D 13/25* (2016.05); *Y02E 10/728* (2013.01)

(56) References Cited

U.S. PATENT DOCUMENTS

| | | | |
|---|---|---|---|
| 2005/0239563 A1* | 10/2005 | Pondorfer | A63G 1/28 472/33 |
| 2011/0239584 A1* | 10/2011 | Tuong | E04H 12/02 52/745.17 |
| 2015/0354766 A1* | 12/2015 | Townsend, Jr. | F16M 13/022 362/370 |
| 2016/0060861 A1* | 3/2016 | Darden | E04H 3/24 52/111 |
| 2016/0130832 A1* | 5/2016 | Zavitz | F03D 13/10 52/40 |

FOREIGN PATENT DOCUMENTS

| | | |
|---|---|---|
| FR | 2587399 A1 | 3/1987 |
| RU | 2189935 C2 | 9/2002 |

OTHER PUBLICATIONS

Written Opinion received in PCT Application No. PCT/ES2016/070653, dated Dec. 13, 2016.

* cited by examiner

GUIDING DEVICE FOR ASSEMBLING WIND TURBINE TOWERS

TITLE OF THE INVENTION

This application is the U.S. National Phase under 35 U.S.C. § 371 of International Application No. PCT/ES2016/070653, filed Sep. 20, 2016, designating the U.S., and published in Spanish as WO 2017/051048 A1 on Mar. 30, 2017, which claims priority to Spanish Patent Application No. P201531355, filed Sep. 23, 2015, the entire contents of which are incorporated herein by reference.

TECHNICAL FIELD

The present invention relates to a guiding device for assembling towers and/or foundations for wind turbines, essentially for hoisting and/or anchoring wind turbine towers, for example concrete telescopic towers, both onshore and offshore.

Therefore, the main application sector of the present invention is the construction industry, especially in assembling towers, in combination with the renewable or green energy industry, specifically wind energy.

BACKGROUND OF THE INVENTION

The use of guiding devices to carry out the relative movement between two adjacent and/or concentric structures, or elements of a structure, is widely known.

Similarly, different means and/or systems for assembling structures are known, more specifically means for hoisting adjacent and/or concentric structures, either in the field of general structures, for example general high-rise structures, or in the more specific field of wind energy, especially in the field of wind turbine towers.

For example, the document FR 2587399 describes a self-elevating tower comprising guide means that comprise two plates arranged inside the framework of bars and forming a V inside the different tower sections, which incorporate a plastic anti-friction runner in one of the faces thereof.

Similarly, document RU 2189935 C2 describes a telescopic mast for a crane that incorporates guide runners to facilitate the hoisting of said mast.

Furthermore, the documents EP 0201645 A2 or FR 2476727 A2 describe telescopic antennas and self-elevating towers, respectively, having guide means that consist of wheels incorporated in one of the sections to be moved.

However, as can be seen, none of the hoisting systems describes a guiding device such as the one described in the present invention, which resolves the significant problems existing in the field of the current state of the art, since it is capable of supporting very high loads, that at the same time has a high adaptation capacity to adapt to geometric variations or imperfections in the elements to be guided, and that entails great advantages with respect to those described above.

DESCRIPTION OF THE INVENTION

The present invention aims to provide a guiding device for assembling towers and/or foundations for wind turbines, which can be onshore and/or offshore, and especially for telescopic wind turbine towers, such that the assembly process of said structures is facilitated and optimised. For the purposes of the present invention, it is understood that the shaft of a wind turbine tower can be considered to be part of the foundation of the same.

Another aim of the present invention is to provide a guiding device that allows relative sliding between a mobile element of the wind turbine tower and a support element, which can comprise, for example but not limited to the present invention, two sections of the shaft of the wind turbine tower and/or a section thereof and an auxiliary structure, and which allows said sliding whilst being able to adapt the geometry thereof depending on the geometric or other imperfections that may exist in said section, especially if it is a concrete section, where the tolerances and variations are greater than in metal sections.

The guiding device according to the present invention is more efficient than those described above since it has particular characteristics that contribute new advantages to the hoisting and/or anchoring of a wind turbine tower, such as the capacity to withstand large loads while at the same time providing a large geometric adaptation capacity.

To do so, the present invention proposes a guiding device for towers and/or foundations for wind turbines intended to allow relative sliding and/or movement between a mobile element and a support element, and which comprises:

a) Sliding means that are in contact with the mobile element and allow the relative movement thereof with respect to the guiding device.

b) Securing means that connect the guiding device to the support element.

c) Means for geometric adaptation disposed between the sliding means and the securing means, which allow load transmission between the sliding means and the securing means while at the same time also allowing relative movement between the two.

d) Reaction or stop means, preferably by way of mortises and/or contact plates, arranged such that they enable direct load transmission between the sliding means and the securing means.

The guiding device according to the present invention can further comprise:

e) Means for geometric pre-adjustment or pretensioning; and/or f) Means for assisting the sliding of the element or structure.

The sliding means of the guiding device according to the present invention can comprise a bearing surface and/or system that is in contact with a section of the wind turbine tower, preferably the mobile element, intended to reduce fiction with the sliding element.

Likewise, the means for geometric adaptation described in the guiding device according to the present invention can be formed by one or several elements for geometric adaptation, preferably neoprene, either fitted or not, or a similar, rubber type, elastomer material with suitable deformability characteristics known in the state of the art.

Similarly, the means for geometric adaptation of the guiding device according to the present invention can comprise one or several, preferably elastic, elements in the shape of parts or springs, and/or one or several hydraulic and/or pneumatic elements that can enable active control of the force and/or deformation of the guiding device and, as a result, capable of regulating the distance between the sliding means and the securing means.

Without limiting the scope of the present invention, the reaction or stop means of the guiding device according to the present invention can be based on mortise-shaped elements and/or independent elements, in another plan position, or in the geometry itself of the elements, which in any case only start to act as of a certain level of deformation of the guiding device, such that both the mortise-shaped elements and the independent elements allow direct load transmission between the sliding means and the securing means.

These reaction or stop means can transmit the loads in a direction that is essentially perpendicular to the contact plane of the guiding device with the mobile element and/or the forces parallel to the plane of the sliding surface only as of a certain level of deformation of the means for geometric adaptation and/or certain relative movement between the securing means and the sliding means, for example with interlocking mortises between the securing means and the sliding means.

Preferably, the means for geometric adaptation are arranged inside mortises by way of a piston.

As for the means for geometric pre-adjustment or pretensioning, they can be defined, for example, by one or several clamping bolts that enable the initial precompression of the means for geometric adaptation, or by any other means known in the state of the art that enables a certain deformation to be generated in the means for geometric adaptation when there are no other loads acting thereon, as well as generating a force on the mobile element in a direction that is essentially perpendicular to the contact surface. These means for geometric pre-adjustment can be used, for example, to generate a certain initial contact force between the sliding means and the mobile element, or to cancel or reduce said force in order to retrieve the guiding device.

Similarly, the securing and/or fastening means comprise at least one metal element, preferably at least one bolt, which is fastened to the support element. In a particular case, but the invention not being limited thereto, the guiding device described in the present invention can also comprise securing and/or fastening means that use the existing casings for the pretensioning bars and/or cables.

Similarly, but the invention not being limited thereto, the guiding device according to the present invention can be integrated in a kit and/or assembly that also includes means for hoisting the tower.

The guiding device, object of the present invention, can comprise means for assisting the sliding of the elements or structures, whether by means of greases or other fluids that reduce friction between elements. Interspersed sheets made of low friction materials such as Teflon or other methods known in the state of the art can also be used.

Lastly, the guiding device described in the present invention can be completely or partially recoverable and reusable for more than one phase of the assembly method for the wind turbine tower and/or for assembling more than one wind turbine tower, this possibly being modular, such that some means or others can be disassembled and/or replaced.

The guiding device according to the present invention allows relative movement between a support element and a mobile element, regardless of the absolute movements of said elements, one possibly being mobile and the other fixed, or both being mobile.

BRIEF DESCRIPTION OF THE DRAWINGS

The previous advantages and characteristics, in addition to others, shall be understood more fully in light of the following detailed description of exemplary embodiments, with reference to the drawings attached, which must be taken by way of illustration and not limitation, wherein.

PREFERRED EMBODIMENT OF THE INVENTION

Figure 1A:
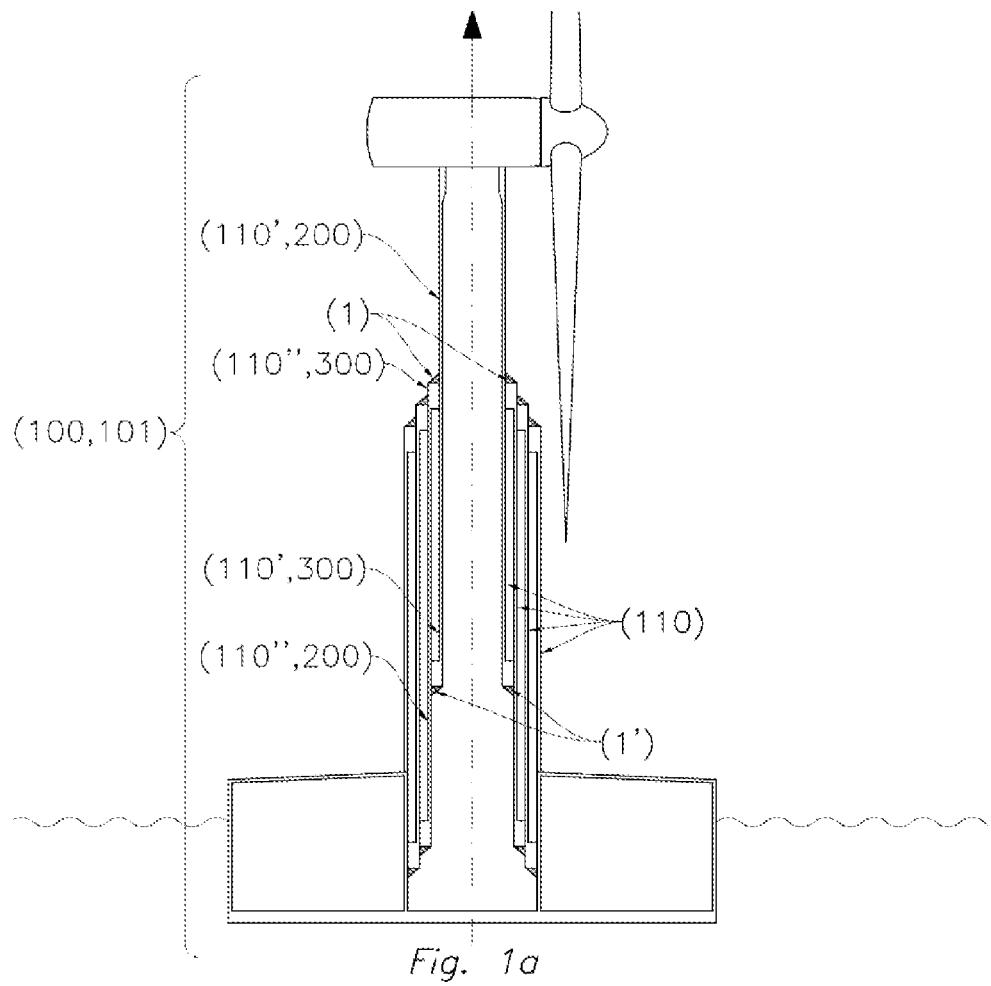
FIG. 1a) shows an elevation view of the position of the guiding devices when hoisting a telescopic tower.

FIG. 1a) shows an elevation view of the position of the guiding devices (1, 1') during the assembly of a wind turbine tower (100), which is offshore in this case.

This case shows, by way of example, the hoisting of a wind turbine tower (100), and specifically, the hoisting of a telescopic tower (101), made up of different sections (110).

Preferably, the guiding devices (1) are arranged in the two elements or structures (110', 110") that are involved in the movement, but they can also be solely located in one of said elements or structures (110', 110").

Moreover, in this embodiment, in the case of guiding devices (1), the section of telescopic tower (110') acts as a mobile element (200) and the section (110") acts as a support element (300), while in the guiding devices (1'), the section (110') acts as a support element (200) and the section (110") acts as a mobile element (300).

Preferably, the guiding elements (1, 1') are arranged in the upper and/or lower portion of the elements or structures (110', 110"), but they can also be arranged on the side faces of the elements or structures (110', 110"), being in the middle thereof.

Figure 1B:
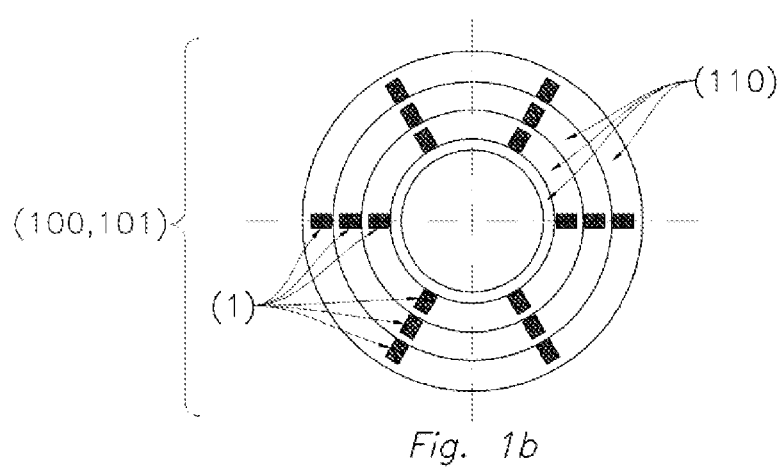
FIG. 1b) shows a plan view of the position of the guiding devices when hoisting a telescopic tower.

FIG. 1b) shows a plan view of the position of the guiding devices (1) during the assembly of a wind turbine tower (100).

This case shows, by way of example, the hoisting of a wind turbine tower (100), and specifically, the hoisting of a telescopic tower (101).

Preferably, there are three or more devices (1, 1') for the hoisting and/or anchoring of a wind turbine tower (100). In this embodiment, there are six devices (1) on the plane for hoisting the different sections (110) of the tower.

Figure 2:
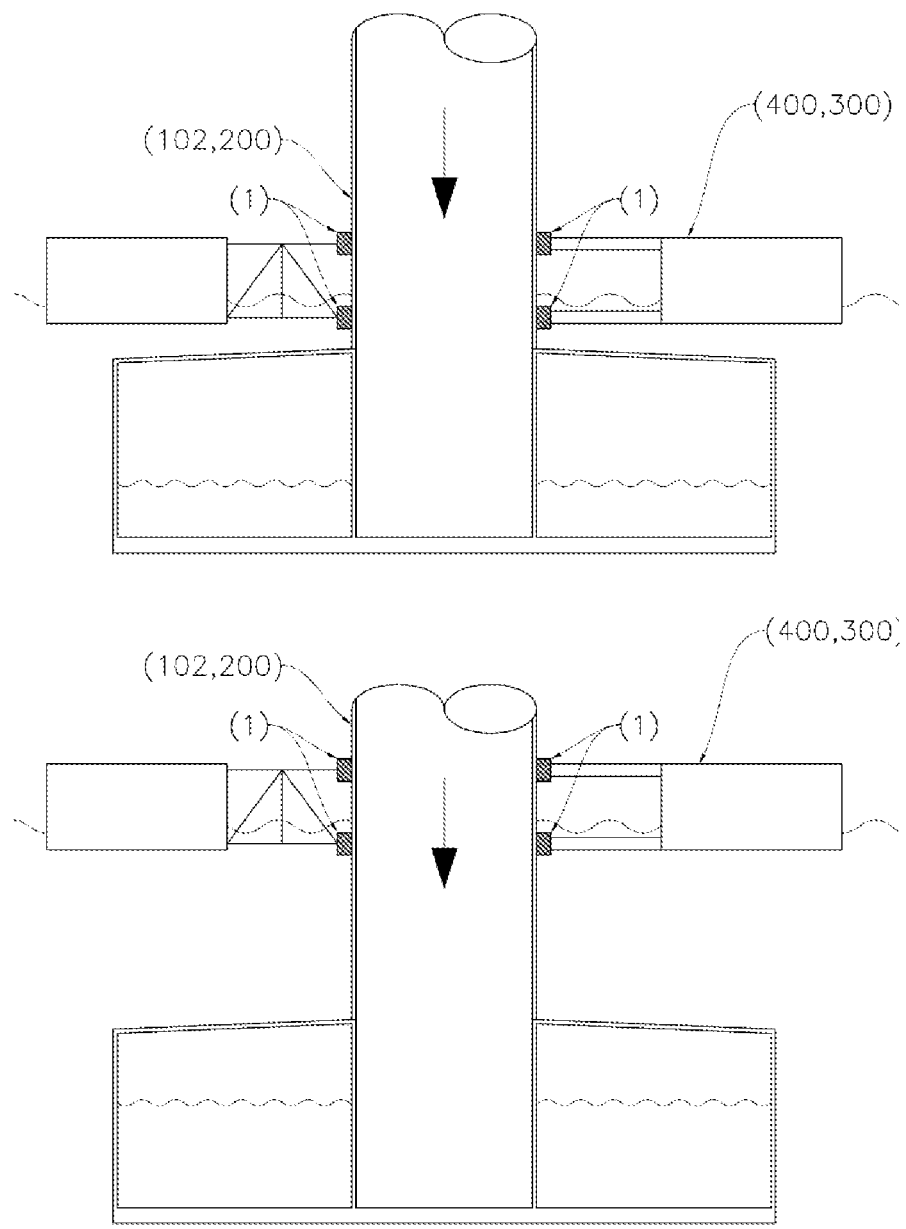
FIG. 2 shows several phases of the anchoring of an offshore tower along with the position of the guiding devices at all times.

FIG. 2 shows several phases of the anchoring of an offshore tower (102). In this embodiment, the guiding devices (1) are located in an auxiliary floating and/or stability device (400) such that the tower (102) can slide through the inside thereof during its anchoring. In this particular case, the tower (102) acts as the mobile element (200), while the structure (400) acts as the support element (300).

Figure 3:
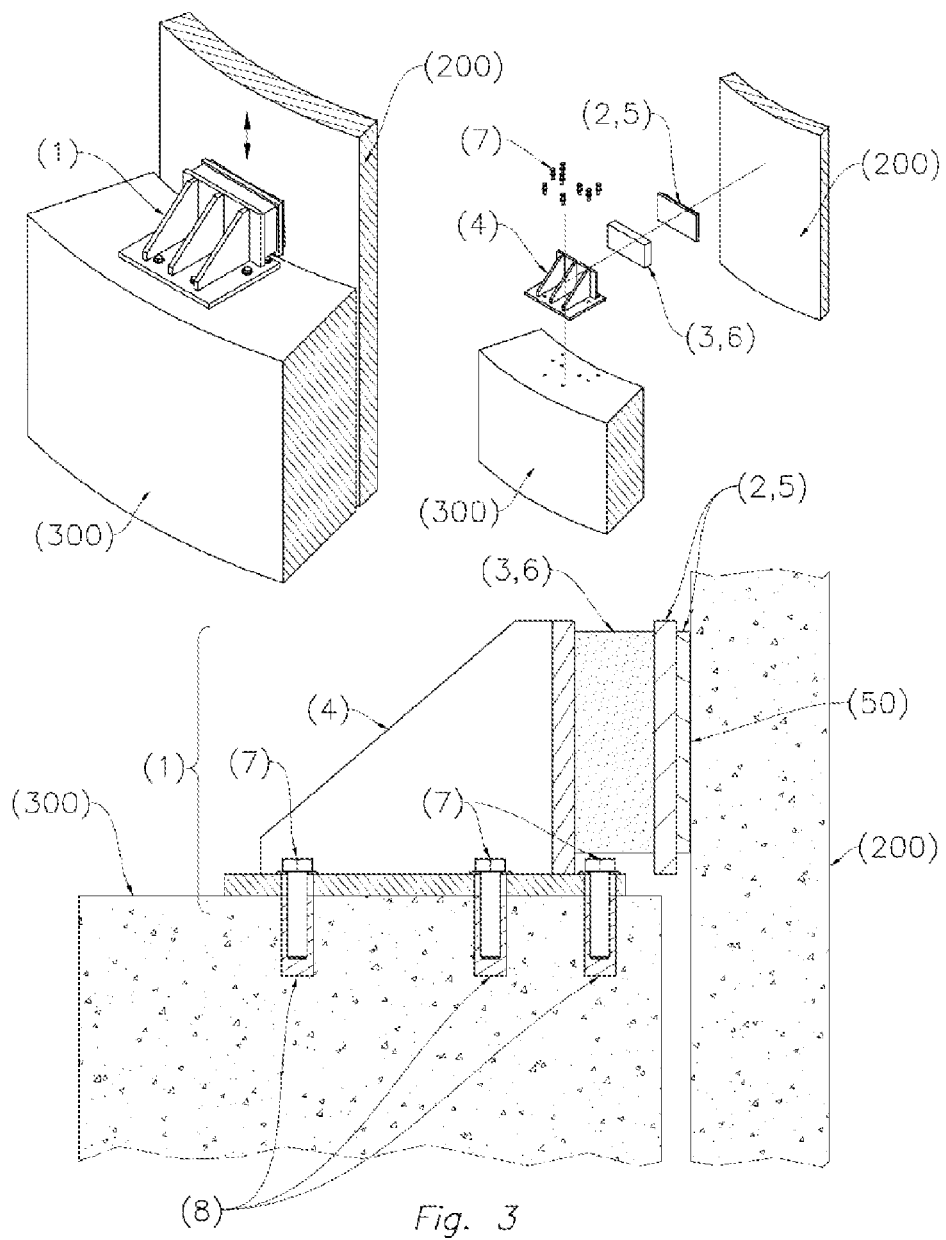
FIG. 3 shows a basic guiding device according to the invention.

FIG. 3 shows a guiding device (1) according to the present invention comprising sliding means (2), means for geometric adaptation (3) and securing means (4).

In this embodiment, the guiding device (1) is fastened to the upper portion of the support element (300), while the latter is in contact with the mobile element (200) by means of the sliding means (2).

By way of example, but the invention not being limited thereto, the sliding means (2) comprise a surface or pad with a low friction coefficient (5) and the means for geometric adaptation (3) are formed by a neoprene part (6).

The guiding device (1) is fastened to the support element (300) by means of the securing means (4) that in this case comprise, but the invention not being limited thereto, bolts (7) secured to bushings (8) embedded in the support element (300) itself.

Similarly, the guide device (1) according to the present invention can comprise means for assisting the sliding (50) which can consist of greases or other fluids that facilitate the sliding between the mobile element (200) and the sliding means (2), by means of reducing the friction between the two. Interspersed sheets made of low friction materials such as Teflon or other methods known in the state of the art can also be used, for example, placed in an endless chain configuration.

Figure 4:
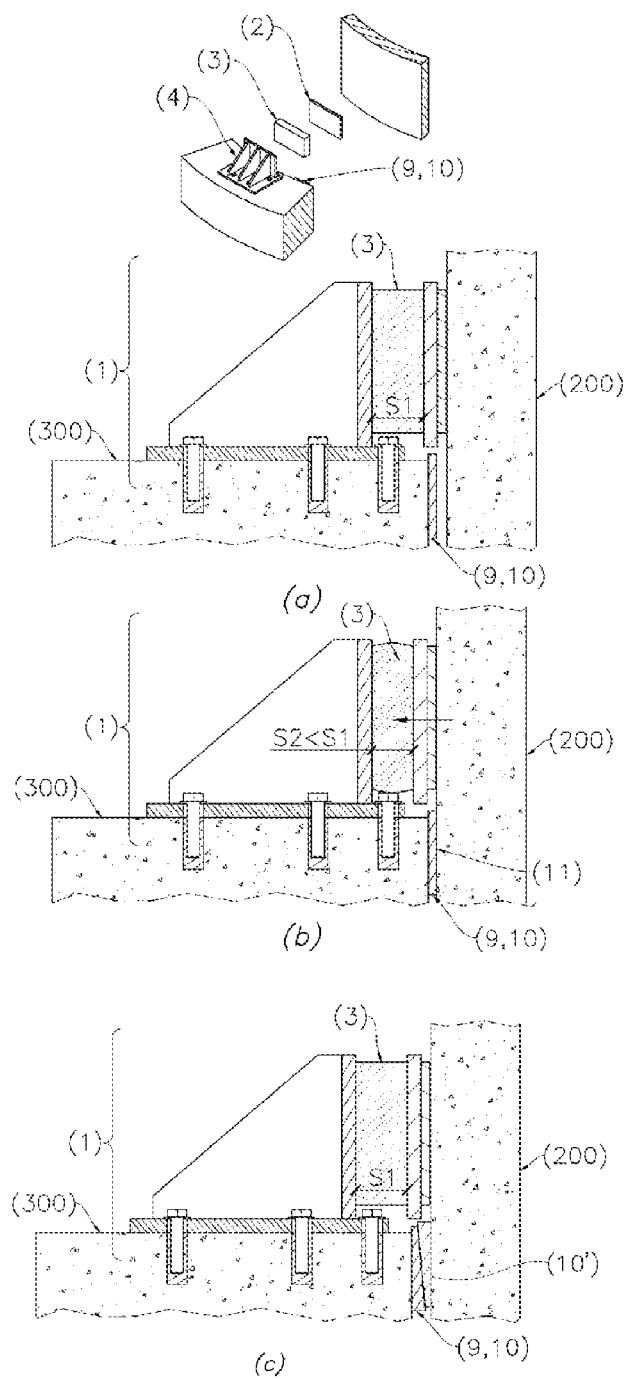
FIG. 4a) shows a guiding device according to the invention comprising independent reaction or stop elements.
FIG. 4b) shows a guiding device according to the invention in the position in which the reaction or stop means start to act.
FIG. 4c) shows an embodiment of the invention where the reaction or stop means comprise external elements, based on two wedges that are facing and opposite each other.

FIGS. 4a) and b) show another preferred embodiment of the guiding device (1) according to the invention further comprising reaction or stop means (9). In this embodiment, the reaction or stop means (9) are formed by external elements (10), preferably contact plates, which transmit the load perpendicular to the contact plane between the sliding means and the mobile element. In one embodiment of the invention, said external elements (10) that are free from the main body of the guide can be formed by more than one part and/or can be, for example, wedge-shaped. In particular, according to that which is shown in FIG. 4c), said external elements (10) can comprise two wedges that are facing and opposite each other (10'), such that the inclined planes thereof are in contact with each other and the vertical planes thereof are in contact with the mobile element (200) and with the support element (300), respectively. Adequately orienting the inclination of the inclined plane in relation to the direction of the relative movement between the mobile element (200) and the support element (300) means that the support element (300) does not prevent said movement, but it does enable load transmission in the direction perpendicular to the contact faces of the reaction means (9) with the mobile element (200) and/or with the support element (300). Similarly, it means that said reaction means (9) can be arranged and pressed between the mobile element (200) and the support element (300), adapting to the variations or tolerances of the free distance that separates them. The external elements (10) and/or any of the parts thereof can incorporate elements and/or protuberances intended to facilitate the securing thereof to the support element (300) and/or to the mobile element (200) and/or intended to prevent them from falling through the free space between the mobile element (200) or the support element (300).

FIG. 4b) shows that this system enables a certain deformation of the means for geometric adaptation (3), starting with a thickness S1 and reducing to S2, such that there is direct contact between the external elements (10) and the mobile element (200), forming a direct contact (11) between rigid and high capacity elements.

Figure 5:
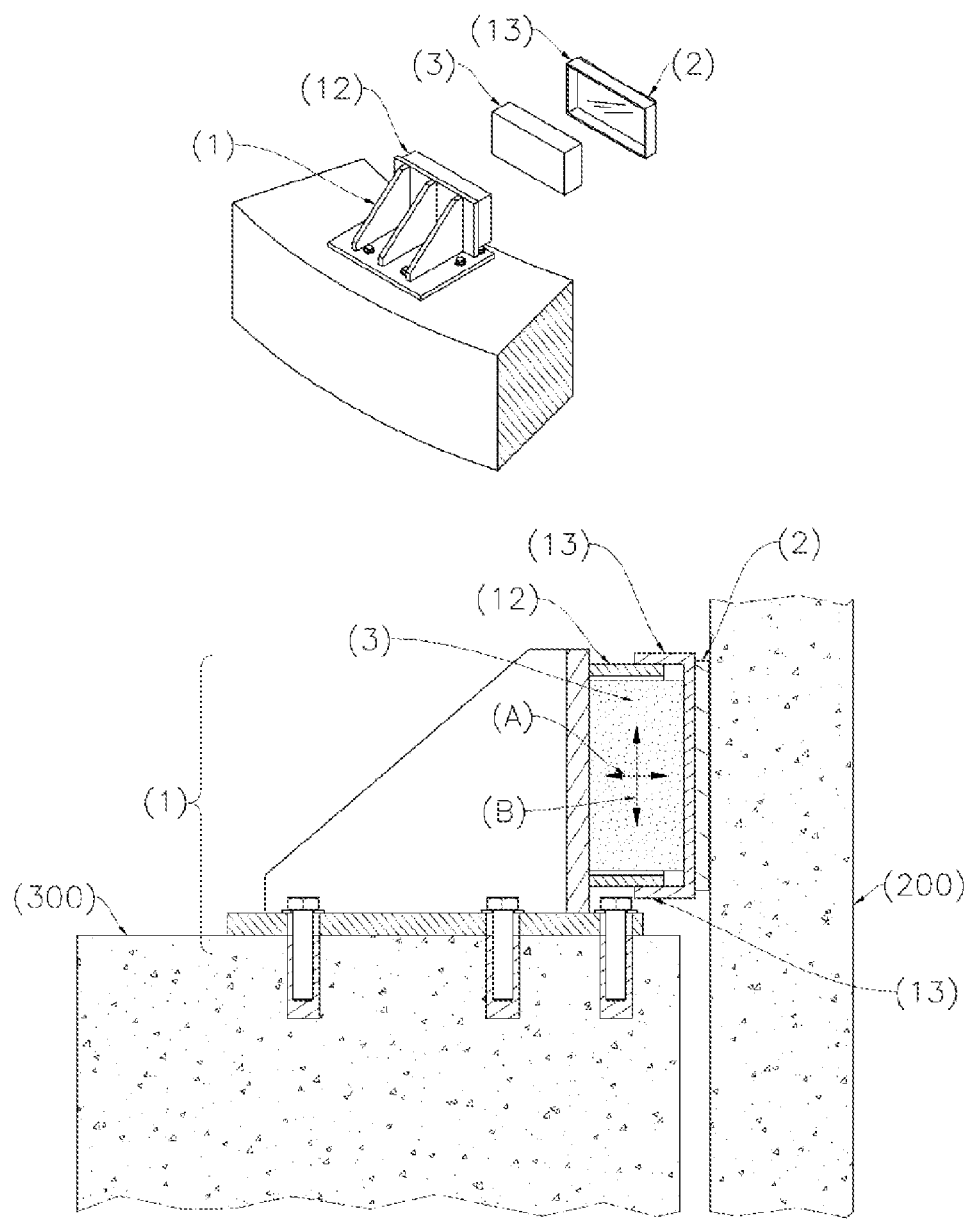
FIG. 5 shows a guiding device according to the invention comprising reaction or stop means in the form of mortises.

FIG. 5 shows another preferred embodiment of the guiding device (1) according to the present invention.

In this embodiment, the reaction or stop means (9) comprise a first mortise (12) connected to the securing means and inside of which the means for geometric adaptation (3) are arranged.

The reaction or stop means (9) further comprise a second mortise (13) connected to the sliding means. Said second mortise (13) fits with the first mortise (12) such that relative movement between the sliding means and the securing means is allowed in the direction perpendicular to the sliding surface but prevents it if it is parallel to the sliding surface.

In this way, the movement of the means for geometric adaptation (3) is allowed in the direction (A), while the movement is prevented in direction (B).

Figure 6:
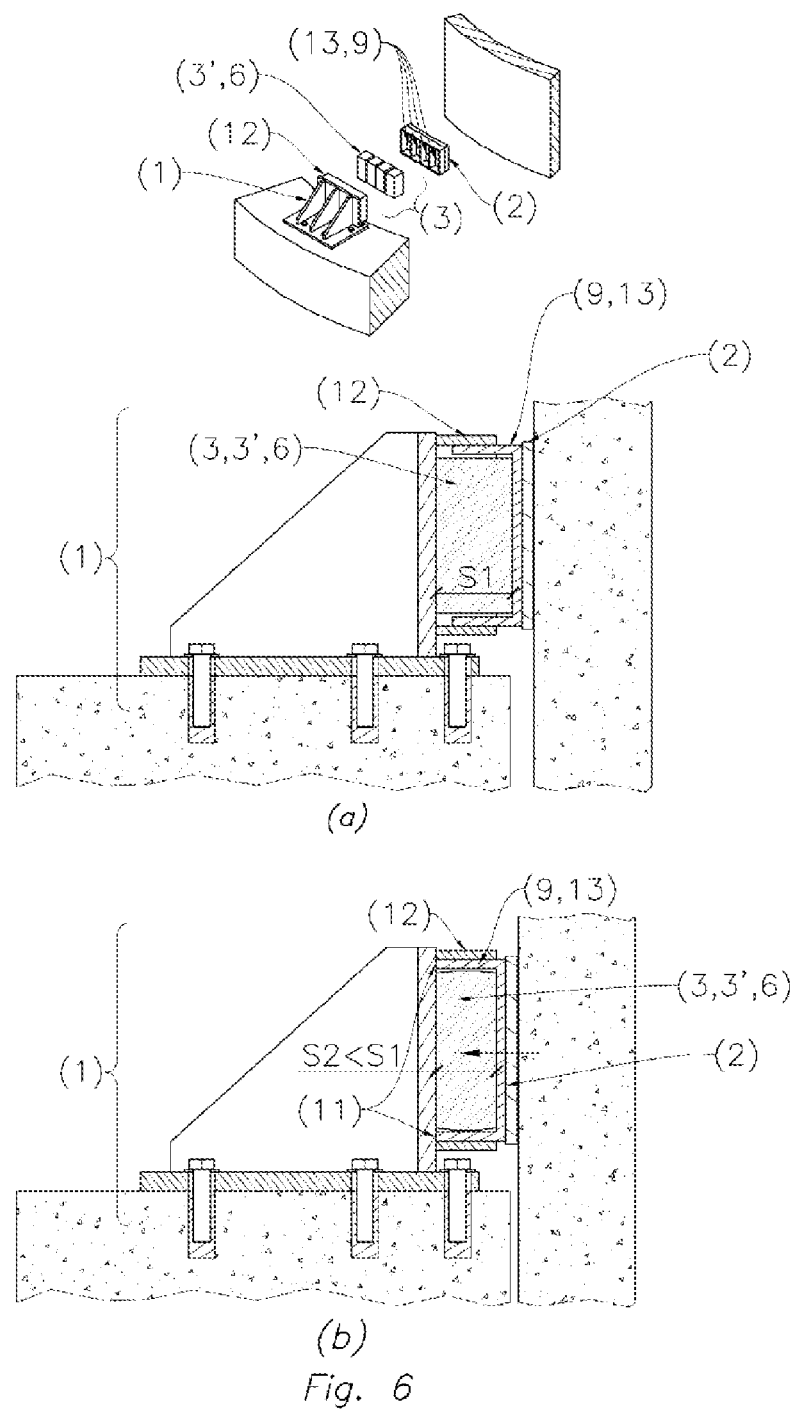
FIG. 6a) shows a guiding device according to the present invention comprising several elements for geometric adaptation.
FIG. 6b) shows a guiding device according to the present invention comprising several elements for geometric adaptation and in the position in which the reaction or stop means start to act.

FIG. 6a) shows another preferred embodiment of the guiding device (1) according to the present invention, where the means for geometric adaptation (3) are formed by several elements for geometric adaptation (3'). In this case, but the invention not being limited thereto, the means for geometric adaptation (3) consist of four neoprene cubes (6), installed inside different caissons (13) that act by way of reaction or stop means (9).

Similarly to FIG. 4b), FIG. 6b) shows a certain deformation of the means for geometric adaptation (3) until there is direct contact between the caisson (12) and the sliding means (2), forming direct contact (11) between the rigid and high capacity elements.

Figure 7:
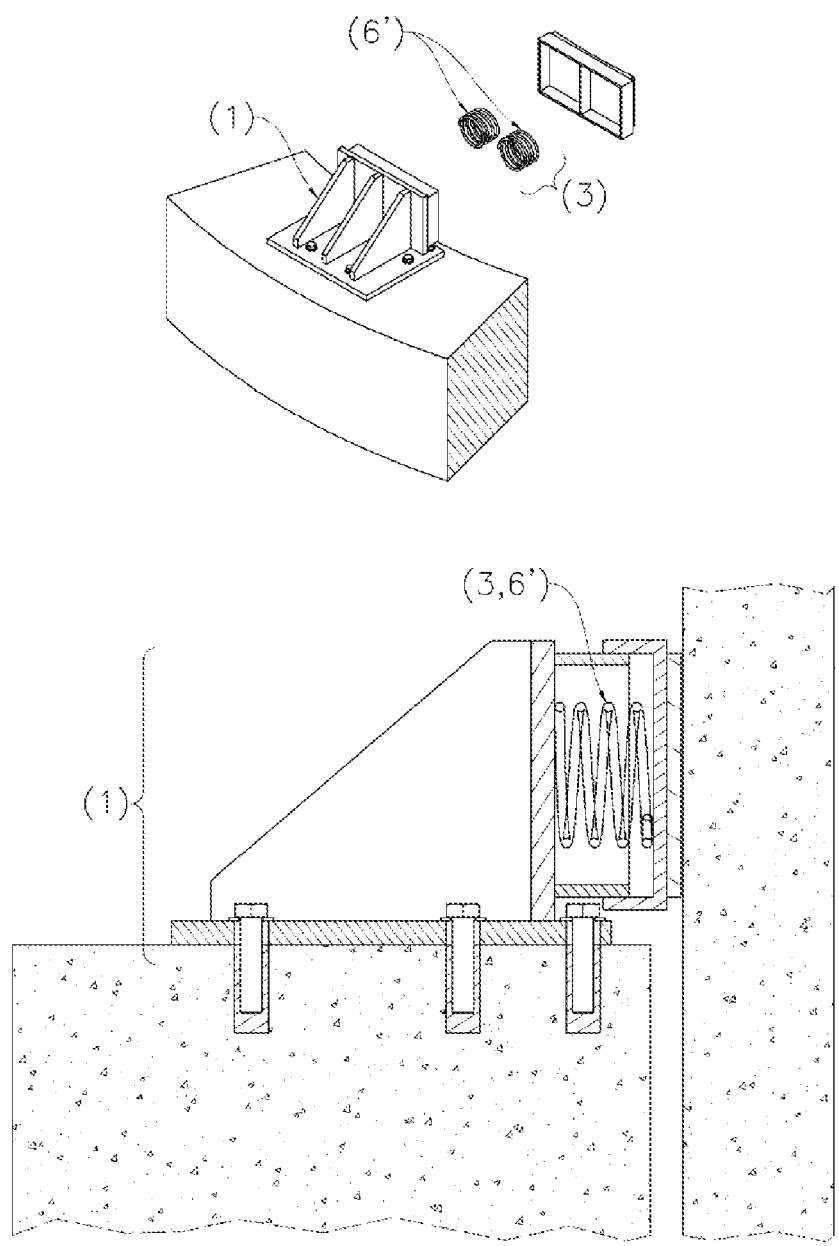
FIG. 7 shows a guiding device according to the present invention with a variation with respect to the means for geometric adaptation.

FIG. 7 shows a guiding device (1) according to the present invention comprising means for geometric adaptation (3) formed by a spring-type thrust element (6'). Similarly, these means for geometric adaptation (3) can comprise active hydraulic or pneumatic thrust elements.

Figure 8:
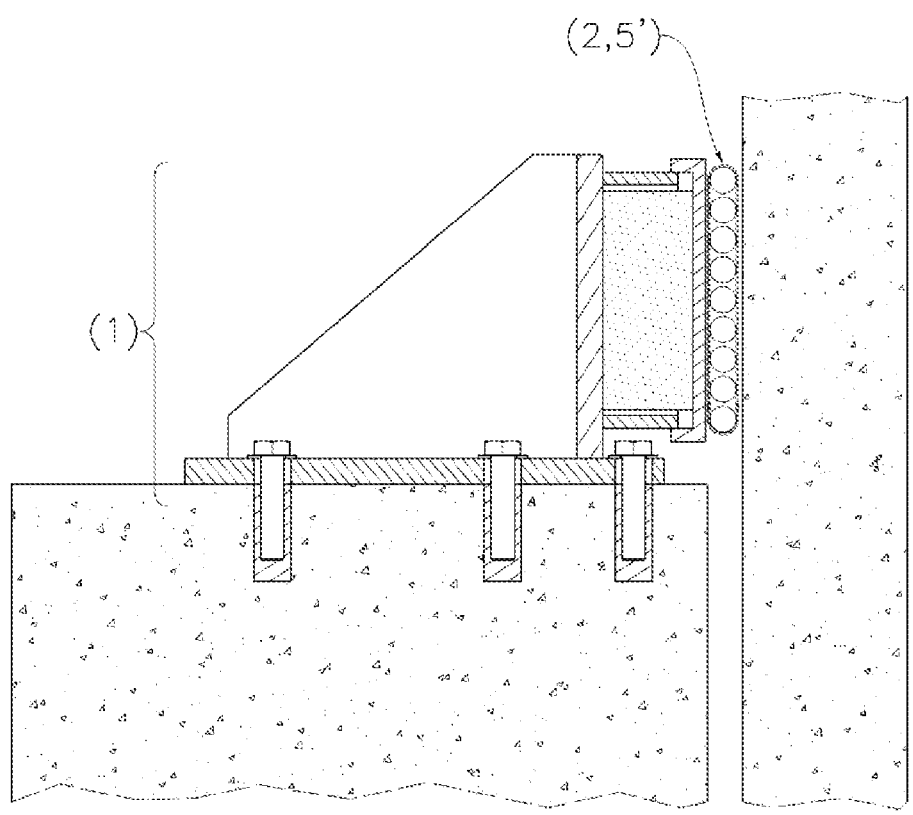
FIG. 8 shows a guiding device according to the present invention with a variation with respect to the sliding means.

As for FIG. 8, it shows another embodiment of a guiding device (1) according to the present invention. In this case, the sliding means (2) are formed by a bearing system (5'), preferably formed by a large number of shafts to significantly distribute the load.

Figure 9:
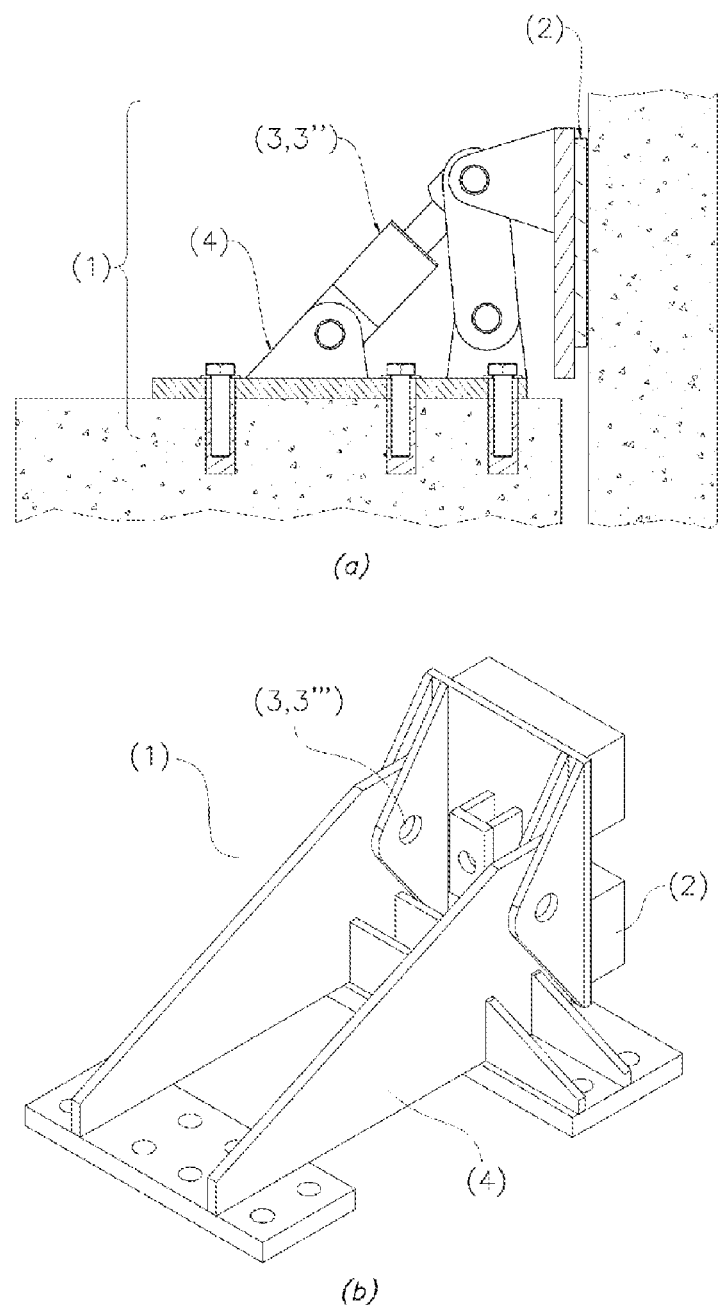
FIG. 9a) shows a guiding device according to an alternative embodiment of the present invention comprising first means for geometric adjustment.
FIG. 9b) shows a guiding device according to an alternative embodiment of the present invention comprising second means for geometric adjustment.

FIG. 9a) shows another alternative embodiment of a guiding device (1) according to the present invention. In this case, the means for geometric adaptation (3) comprise a hydraulic element (3") that allows the distance between the sliding means (2) and the securing means (4) to be regulated.

FIG. 9b) shows another alternative embodiment of a guiding device according to the present invention. In this case, the means for geometric adaptation (3) comprise a ball joint (3''') that allows a pivoting movement between the sliding means (2) and the securing means (4).

Figure 10:
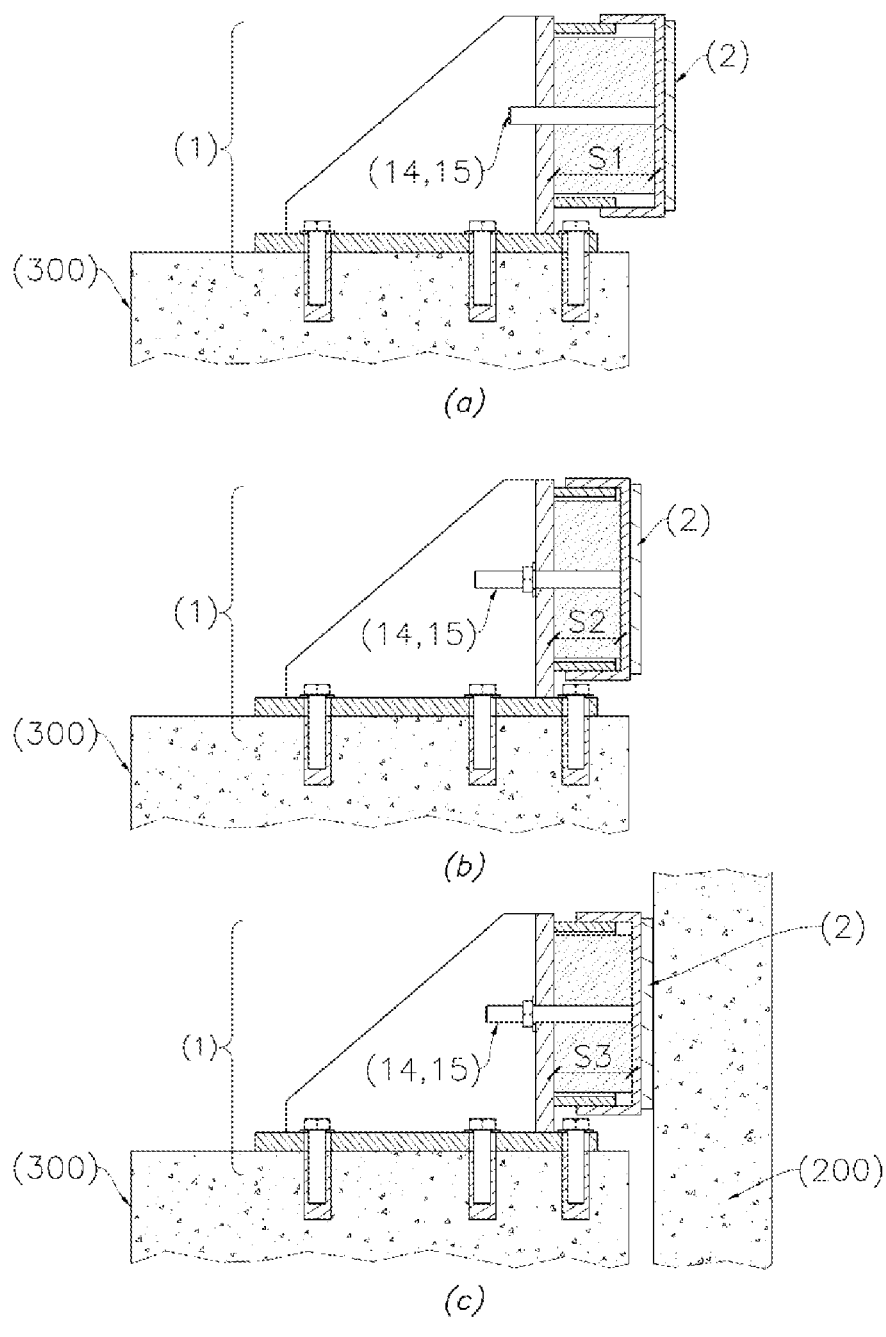
FIG. 10a) shows a guiding device according to the present invention comprising means for geometric pre-adjustment or pretensioning in an initial position.
FIG. 10b) shows a guiding device according to the present invention that is pretensed by means of the means for geometric pre-adjustment or pretensioning.
FIG. 10c) shows a guiding device according to the present invention comprising means for geometric pre-adjustment or pretensioning during the movement of the elements.

FIGS. 10a), b) and c) show a guiding device (1) according to the present invention further comprising means for geometric pre-adjustment or pretensioning (14). These means comprise elements capable of generating a certain level of deformation on the means for geometric adaptation when there is no external load.

FIG. 10a) shows the initial position of the assembly method, with the guiding device without adjustments and before coming into contact with the mobile element.

In this embodiment, by way of example but the invention not being limited thereto, the means for geometric pre-adjustment (14) are formed by a clamping bolt (15), welded to the sliding means (2). These means for geometric pre-adjustment or pretensioning (14) enable an initial deformation or load to be applied on the device (1), as shown in FIG. 10b), such that the thrust in the contact between the device (1) and the mobile element (200) can then be adjusted, as seen in FIG. 10c), by means of adjusting or removing the nut of said clamping bolt (15).

These means for geometric pre-adjustment can also be used to separate the sliding means (2) and the mobile element (200) in order to remove the device (1).

Figure 11:
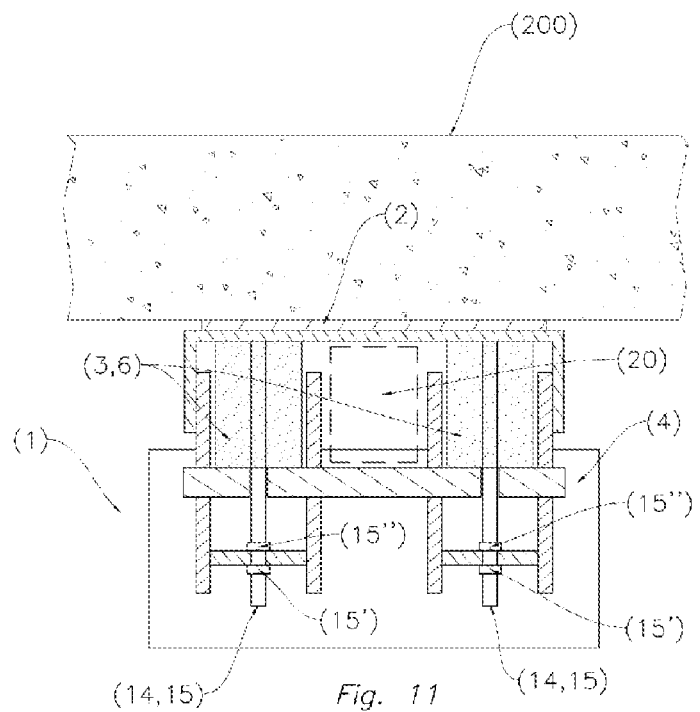
FIG. 11 shows a guiding device according to the present invention comprising means for geometric pre-adjustment or pretensioning capable of exerting a force of the mobile element.

FIG. 11 shows another preferred embodiment of a guiding device (1) according to the present invention where the means for pre-adjustment (14) comprise clamping bolts (15) welded to the sliding means (2) that, in addition to comprising a nut (15') that enables an initial deformation or load to be applied on the device (1), comprise a nut (15") such that the means for pre-adjustment can also create a force on the mobile element in a direction that is essentially perpendicular to the contact surface.

Moreover, in this embodiment, the guiding device (1) comprises a space (20) intended to house a hydraulic element, preferably a hydraulic jack that is capable of generating a force on the mobile element in a direction that is essentially perpendicular to the contact surface.

Figure 12:
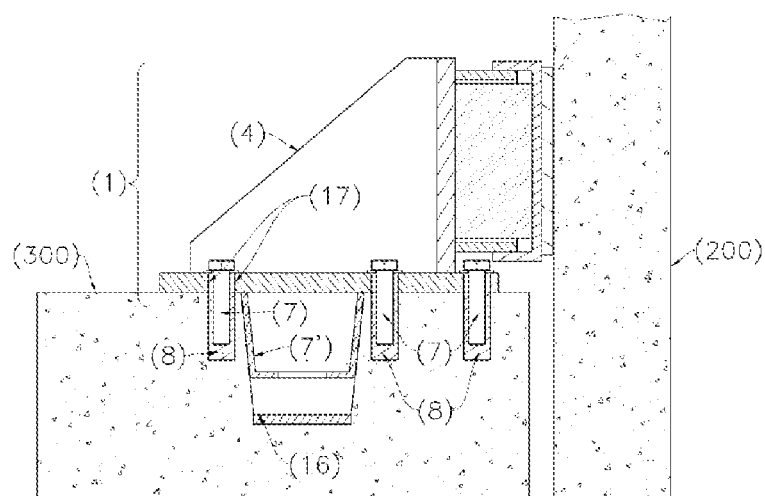
FIG. 12 shows a guiding device according to the present invention comprising alternative securing and/or fastening means to the support element.

FIG. 12 shows another preferred embodiment of the guiding device (1) according to the present invention where the securing means (4) comprise bolts (7) secured to bushings (8) embedded in the support element (300) and/or a securing system (7') adapted to the casings (16) in the support element (300).

Likewise, these securing means (4) can also comprise slotted holes (17) to adapt the position of the guiding device (1).

Figure 13:
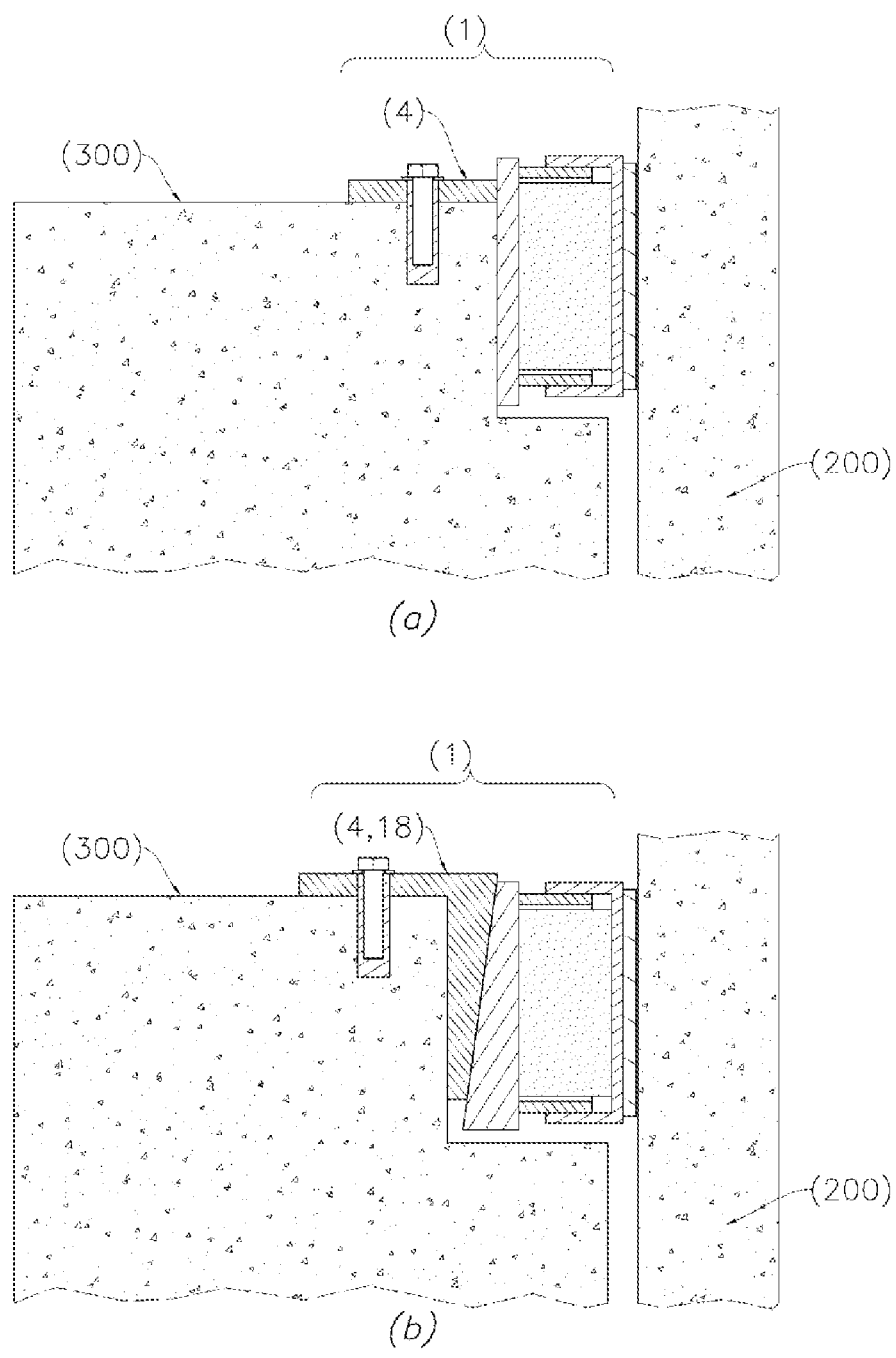
FIGS. 13(a)-(b) shows a guiding device according to the present invention

FIG. 13a) shows another preferred embodiment of the guiding device (1) according to the present invention where the support element (300) has a gap to house the device, to improve load transmission between the device and support element.

In this case, FIG. 13b) shows a guiding device (1) according to the present invention where the securing means (4) comprise a wedge-shaped double plate (18) to facilitate the removal of the guiding device (1).

Figure 14:
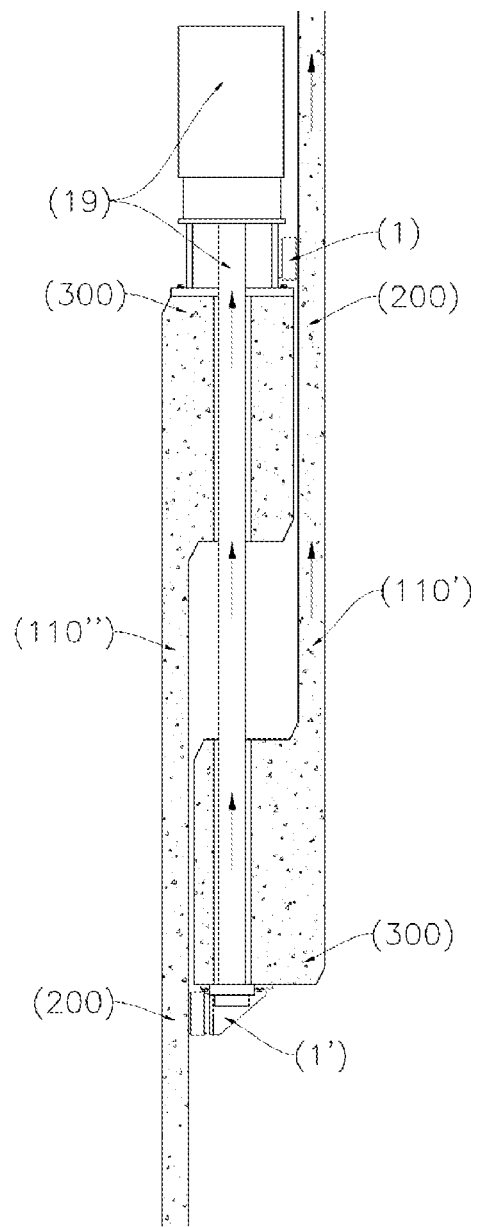
FIG. 14 shows a guiding device according to the present invention that is integrated in a kit and/or assembly that includes means for hoisting the tower.

FIG. 14 shows another preferred embodiment of the guiding device (1) according to the present invention where said guiding device can be integrated in a kit and/or assembly that also includes means for hoisting the tower, for example jacks and cables (19). In this embodiment, it can be seen that the inner section (110') acts as the mobile element (200) in the upper guiding device (1) and as the support element (300) in the lower guiding device (1'), while the outer section (110") acts as the support element (300) in the upper guiding device (1) and as the support element (300) in the lower guiding device (1').

Figure 15:
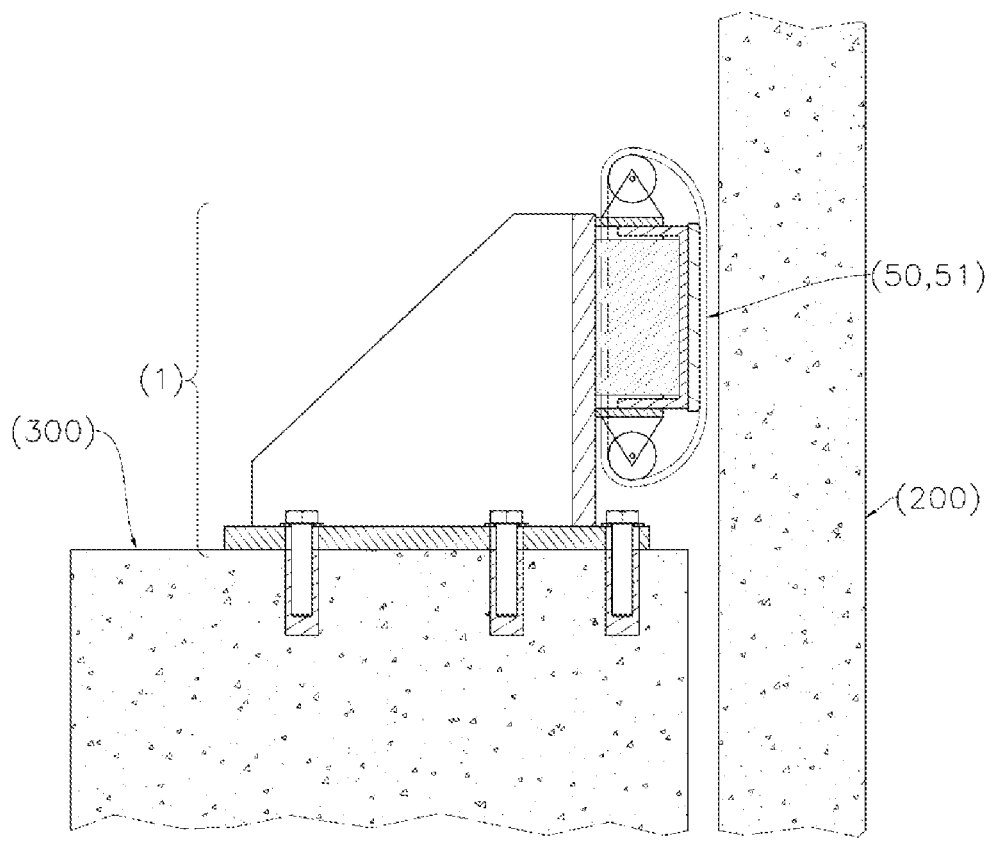
FIG. 15 shows a guiding device according to the present invention with a Teflon sheet in an endless chain configuration.

FIG. 15 shows another preferred embodiment of the guiding device (1) according to the present invention, wherein there are, by way of example but the invention not being limited thereto, means for assisting the sliding (50) that, in this case, comprise Teflon sheets (51) in an endless chain configuration.

Figure 16:
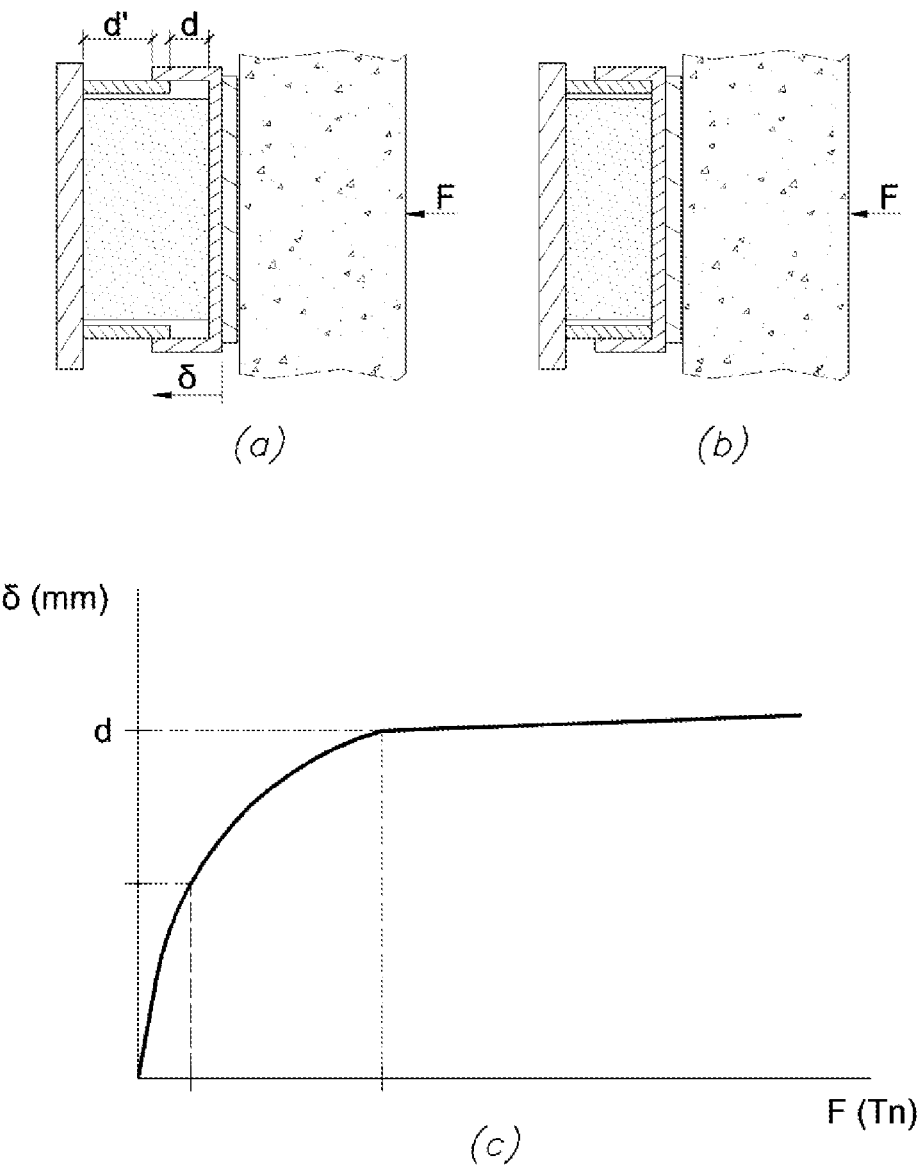
FIGS. 16(a)-(c) shows a graph of the behaviour of the guiding device depending

FIG. 16 shows a graph of the behaviour of the guiding device according to the present invention. The graph shows a high geometric adjustment capacity at a low load, until there is contact with the reaction or stop means (9). As of this point, the element has a very high load capacity at low deformation.

Although the figures and above explanations particularly refer to the assembly of wind turbine towers, the guiding device according to the present invention can similarly be used for assembling the foundation or other elements of the substructure of a wind turbine, preferably those that comprise shafts or vertical walls.

What is claimed is:

1. A guiding device configured to enable and/or facilitate relative movement between a mobile element and a support element of a wind turbine tower or a foundation for a wind turbine tower,
wherein the guiding device comprises:
sliding means configured to contact with the mobile element and configured to allow a substantially vertical relative movement of the mobile element with respect to the guiding device;
securing means configured to connect the guiding device to the support element;
means for geometric adaptation disposed between the sliding means and the securing means and configured to allow load transmission between the sliding means and the securing means while and further to allow relative movement between the two sliding means and the securing means;
reaction or stop means comprising mortises and/or contact plates, the reaction or stop means configured to enable direct load transmission between the sliding means and the securing means,
wherein the guiding device is anchored to a substantially horizontal surface of a top portion or a bottom portion of the support element.

2. The guiding device according to claim 1, wherein the means for geometric adaptation are arranged inside the mortises by way of a piston configured to allow relative movement between the sliding means and the securing means in a direction that is essentially perpendicular to the contact plane between the guiding device and the mobile element.

3. The guiding device according to claim 1, wherein the sliding means comprise a low friction surface configured to contact with the mobile element or a bearing system configured to contact with the mobile element.

4. The guiding device according to claim 1, wherein the means for geometric adaptation comprise a deformable and essentially elastic element in the form of a part or spring.

5. The guiding device according to claim 1, wherein the means for geometric adaptation comprise a hydraulic or pneumatic element configured to regulate a distance between the sliding means and the securing means.

6. The guiding device according to claim 1, wherein the securing means comprise a metal element fastened to the support element.

7. The guiding device according to claim 1, wherein the reaction or stop means are arranged to allow load transmission in a direction that is essentially perpendicular to a contact plane of the guiding device with the mobile element, only as of a threshold level of deformation of the means for geometric adaptation and/or a threshold level of relative movement between the securing means and the sliding means.

8. The guiding device according to claim 1, wherein said device comprises means for pre-adjustment of the geometry of the means for geometric adaptation, arranged such that a threshold level of deformation is generated on the means for geometric adaptation when there is no external load.

9. The guiding device according to claim 1, wherein the means for pre-adjustment is configured to generate a force on the mobile element in a direction that is essentially perpendicular to the contact surface.

10. The guiding device according to claim 1, wherein said guiding device comprises a space configured to house a hydraulic element configured to generate a force on the mobile element in a direction that is essentially perpendicular to the contact surface.

11. The guiding device according to claim 1, wherein said guiding device is completely or partially recoverable and/or reusable for more than one phase of assembling a wind turbine tower.

12. The guiding device according to claim 1, wherein said guiding device comprises reaction or stop means comprising external elements interposed between the mobile element and the support element, and in that said external elements comprise two parts facing each other and wedge-shaped.

13. The guiding device according to claim 1, wherein the means for geometric adaptation comprise a ball joint configured to allow a pivoting movement between the sliding means and the securing means.

14. A kit for wind turbine towers that comprises a guiding device according to claim 1 and at least one means for hoisting wind turbine towers.

15. A method of assembling a wind turbine tower or a foundation for a wind turbine tower, wherein the method comprising:

hoisting a section of tower using the guiding device according to claim 1; and anchoring or sinking a foundation and/or tower using the guiding device according to claim 1.

16. A wind turbine tower or foundation assembled with the method according to claim 15.

17. A wind turbine supported on the wind turbine tower or foundation according to claim 16.

* * * * *

UNITED STATES PATENT AND TRADEMARK OFFICE
CERTIFICATE OF CORRECTION

PATENT NO. : 10,669,736 B2
APPLICATION NO. : 15/762977
DATED : June 2, 2020
INVENTOR(S) : Jose Serna García-Conde Page 1 of 1

It is certified that error appears in the above-identified patent and that said Letters Patent is hereby corrected as shown below:

In the Specification

In Column 4, Line 52, delete "invention" and insert --invention.--.

In Column 4, Line 60, delete "depending" and insert --depending.--.

In the Claims

In Column 8, Line 48, Claim 1, delete "two sliding" and insert --sliding--.

Signed and Sealed this
Twenty-seventh Day of August, 2024

Katherine Kelly Vidal
*Director of the United States Patent and Trademark Office*